(No Model.)
R. D. AKE.
COMBINED BRUSH AND SCOOP.
No. 603,071.          Patented Apr. 26, 1898.
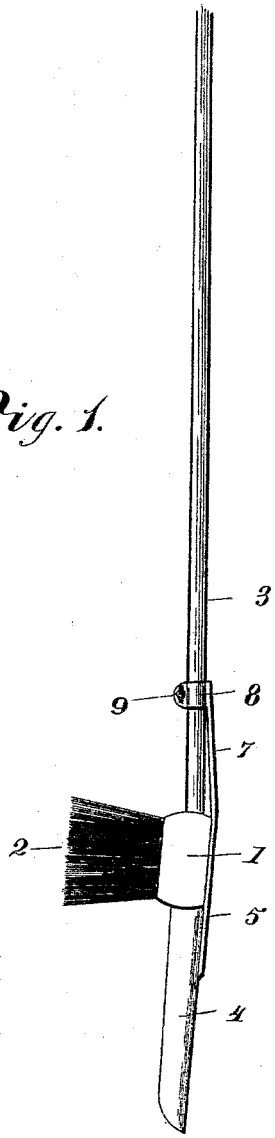
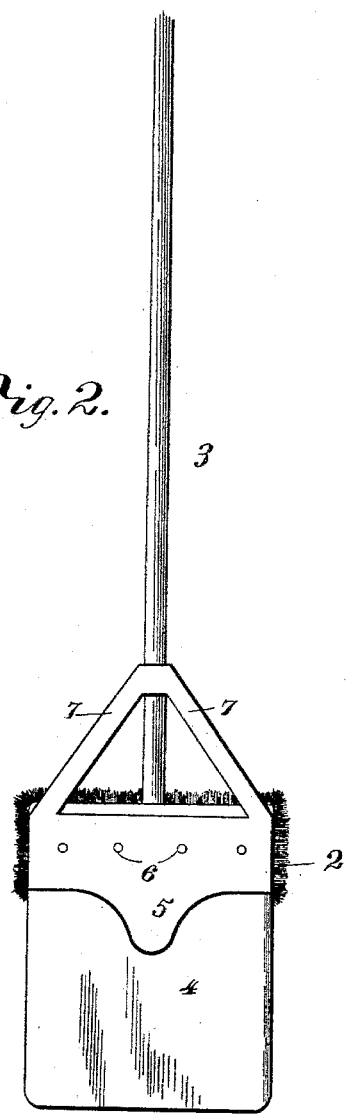
Witnesses
C. H. Walker
Victor J. Evans
Inventor
Rosina D. Ake.
By John Wedderburn.
Attorney

UNITED STATES PATENT OFFICE.

ROSINA D. AKE, OF PHILADELPHIA, PENNSYLVANIA.

COMBINED BRUSH AND SCOOP.

SPECIFICATION forming part of Letters Patent No. 603,071, dated April 26, 1898.

Application filed April 21, 1897. Serial No. 633,165. (No model.)

*To all whom it may concern:*

Be it known that I, ROSINA D. AKE, a citizen of the United States, residing at Philadelphia, in the county of Philadelphia and State of Pennsylvania, have invented certain new and useful Improvements in a Combined Brush and Dust Scoop or Shovel; and I do hereby declare the following to be a full, clear, and exact description of the invention, such as will enable others skilled in the art to which it appertains to make and use the same.

The invention relates to a combined brush and dust scoop or shovel especially designed for use for street-cleaning purposes and to save time in its use and expense in its manufacture as compared with the use of separate implements heretofore employed for the purpose.

It will be understood from the following description and claim, reference being had to the accompanying drawings, in which—

Figure 1 represents the improved combined brush and scoop in side elevation. Fig. 2 represents a bottom view of the same.

1 indicates the brush-head, 2 the material forming the brush applied to said head in the usual manner, and 3 represents the handle applied to said head 1, which is socketed in the usual manner to receive said handle. Upon the upper face of the brush-head, supposing the latter to be in proper position for use, is secured the scoop or shovel blade 4, which may be of any usual or preferred form, preferably straight on its forward or receiving edge and contracted into scoop form in rear of said edge. To the rear lower face of said blade is secured a stiffening-plate 5, and through-bolts 6 serve to unite said scoop or shovel with the brush-head in a manner that will be readily understood from an inspection of the drawings. The stiffening-plate 5 is provided at its rear edge with converging arms 7, which terminate in a sleeve 8, through which the handle 3 is passed to engage the brush-head 1, said sleeve being provided with a thumb-nut 9 on its upper face for securing the handle 3 in place on the sleeve 8.

By the construction described a simple, useful, and durable implement is formed, combining both the brush for sweeping the dust into heaps and the shovel or scoop for removing the same by simply inverting the implement for that purpose in a manner that will be readily understood, thereby avoiding the loss of time incident to the employment of separate implements for the purposes indicated and also greatly reducing the expense of construction as compared with the cost of separate implements for the same purposes.

Any desired length may be given to the handle and to the scoop or shovel, and the brush may be of any suitable construction adapting the implement to the purposes indicated or to other analogous uses to which it may be applicable.

Having thus described the invention, what is claimed as new is—

The combination with the brush-head 1 and brush 2, of the scoop or shovel 4 rigidly secured to said brush-head, a stiffening-plate 5 connected to said scoop and brush-head and provided with the converging arms terminating in the sleeve 8, for the reception of the shovel and brush-handle 3, and the thumb-screw or bolt 9 for securing the handle in place in said sleeve and brush-head, substantially as described.

In testimony whereof I have signed this specification in the presence of two subscribing witnesses.

ROSINA D. AKE.

Witnesses:
 JOHN J. MINNICK,
 P. B. CONWAY.